United States Patent [19]
Taylor

[11] Patent Number: 5,677,433
[45] Date of Patent: Oct. 14, 1997

[54] DISAZO FIBER REACTIVE DYESTUFFS

[75] Inventor: John Anthony Taylor, Manchester, United Kingdom

[73] Assignee: Zeneca Limited, London, England

[21] Appl. No.: 693,196

[22] PCT Filed: Jan. 18, 1995

[86] PCT No.: PCT/GB95/00083

§ 371 Date: Aug. 12, 1996

§ 102(e) Date: Aug. 12, 1996

[87] PCT Pub. No.: WO95/21892

PCT Pub. Date: Aug. 17, 1995

[30] Foreign Application Priority Data

Feb. 10, 1994 [GB] United Kingdom ............ 9402618

[51] Int. Cl.⁶ .................... C09B 62/09; D06P 1/382
[52] U.S. Cl. .................... 534/605; 534/612; 8/547
[58] Field of Search ................ 534/605, 612; 8/547

[56] References Cited

U.S. PATENT DOCUMENTS

| 4,626,589 | 12/1986 | Omura et al. | 534/605 |
| 4,693,726 | 9/1987 | Meininger | 534/605 X |
| 5,116,956 | 5/1992 | Miyamoto et al. | 534/612 |

FOREIGN PATENT DOCUMENTS

| 418664 | 3/1991 | European Pat. Off. | 534/612 |
| 568874 | 11/1993 | European Pat. Off. | |
| 62-81455 | 4/1987 | Japan | 534/605 |
| 62-84159 | 4/1987 | Japan | 534/605 |
| 937182 | 9/1963 | United Kingdom | 534/605 |

*Primary Examiner*—Fiona T. Powers
*Attorney, Agent, or Firm*—Cushman Darby & Cushman IP Group Pillsbury Madison & Sutro LLP

[57] ABSTRACT

A compound of Formula (1) and salts thereof.

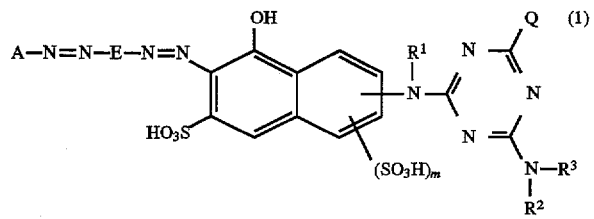

wherein:

A is optionally substituted phenyl;

E is optionally substituted phenylene;

$R^1$ is H or optionally substituted alkyl;

$R^2$ is H or optionally substituted alkyl and $R^3$ is H, optionally substituted alkyl, optionally substituted alkoxy or optionally substituted aryl, or $R^2$ and $R^3$ taken together with the N atom to which they, are attached from an optionally substituted piperidine or morpholine ring;

Q is optionally substituted pyridinium; and m is 0 or 1.

9 Claims, No Drawings

DISAZO FIBER REACTIVE DYESTUFFS

This application claims benefit of international application PCT/GB95/00083, filed Jan. 18, 1995.

This invention relates to organic chemicals, in particular to reactive dyes, their preparation and use.

According to the present invention there is provided a compound of Formula (1) and salts thereof:

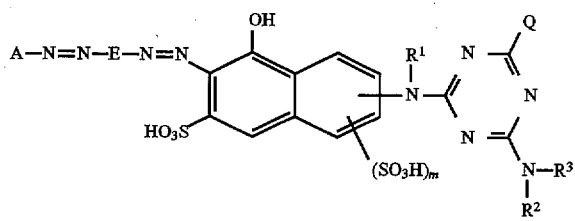

(1)

wherein:

A is optionally substituted phenyl;
E is optionally substituted phenylene;
$R^1$ is H or optionally substituted alkyl;
$R^2$ is H or optionally substituted alkyl and
$R^3$ is H, optionally substituted alkyl, optionally substituted alkoxy or optionally substituted aryl, or
$R^2$ and $R^3$ taken together with the N atom to which they are attached form an optionally substituted piperidine or morpholine ring;
Q is optionally substituted pyridinium; and
m is 0 or 1.

The optional substituents which may be present on A, E, $R^1$, $R^2$, $R^3$ and Q are preferably selected from halo, especially chloro; nitro; $C_{1-4}$-alkyl; $C_{1-4}$-alkoxy; sulpho; carboxy; carbonamido; acylamino, especially acetamido; ureido; hydroxy; phosphato; sulphato; and amino.

A is preferably unsubstituted phenyl or phenyl having 1 or 2 substituents. When A is substituted it is preferred that it has at least one sulpho substituent. In an especially preferred embodiment A is 4-sulphophenyl.

Examples of groups represented by A include 2-, 3- and 4-sulphophenyl; 4-carboxy-2-sulphophenyl; 2,4-disulphophenyl; 2,5-disulphophenyl; 3,5-disulphophenyl; 2-sulpho-4-methoxyphenyl; 2-sulpho-4-methylphenyl; 3-nitrophenyl; 2-methoxy-4-sulphophenyl; 2-methyl-4-sulphophenyl; 4-chloro-2-sulphophenyl; and 2,5-dichloro-4-sulphophenyl.

E is preferably optionally substituted 1,4-phenylene, especially 1,4-phenylene which is unsubstituted or substituted by 1 or 2 of the aforementioned optional substituents, preferably by 1 or 2 groups selected from halo, sulpho, $C_{1-4}$-alkoxy and $C_{1-4}$-alkyl. When E is substituted it preferably has at least one sulpho substituent.

$R^1$ is preferably H or $C_{1-4}$-alkyl, more preferably $C_{1-4}$-alkyl, especially methyl or ethyl. The preference for $R^1$ being $C_{1-4}$-alkyl arises from the surprising finding that this can lead to improved wash-off properties in the dye.

$R^2$ is preferably H, optionally substituted $C_{1-4}$-alkyl, more preferably H or $C_{1-4}$-alkyl, especially methyl or ethyl.

$R^3$ is preferably H, optionally substituted alkyl, optionally substituted phenyl or $C_{1-4}$-alkoxy, more preferably H, optionally substituted $C_{1-4}$-alkyl, phenyl or sulphophenyl, especially H, methyl or ethyl.

Examples of groups represented by $R^2$ and $R^3$ include —$CH_3$, —$CH_2CH_3$, —$CH_2CH_2OH$, —$CH_2CH_2CO_2H$, —$CH_2CH_2SO_3H$, —$CH_2CH_2OSO_3H$, —$(CH_2)_3CO_2H$, —$CH_2CO_2H$, —$CH_2PO_3H_2$, —$CH(CO_2H)CH_2CO_2H$, —$CH(CO_2H)CH_2CH_2CO_2H$, 4-sulphophenyl, 3-sulphophenyl, 2,5- and 2,6-disulphophenyl, —$OCH_3$ and —$(CH_2)_2CH_3$.

Preferably $R^2$ and $R^3$ are free from groups which, on treatment with aqueous alkali, yield groups of formula —$SO_2CH$=$CH_2$. Thus $R^2$ and $R^3$ preferably do not contain groups of formula —$SO_2CH_2CH_2OSO_3H$, —$SO_2CH_2CH_2Cl$ or salts thereof.

In one preferred embodiment $R^2$ and $R^3$ are each independently H, $C_{1-4}$-alkyl or $C_{1-4}$-alkyl having an —OH group, or $R^2$ and $R^3$ taken together with the N atom to which they are attached form an optionally substituted piperidine or morpholine ring. Such compounds have particularly good build-up in exhaust dyeing.

Q is preferably pyridinium having 1 or 2 substituents selected from carboxy, $C_{1-4}$-alkyl and carbonamido (i.e. $CONH_2$). Examples of groups represented by Q include 3- and 4-carboxypyridinium, pyridinium, 3-methylpyridinium, 3- and 4-carbonamidopyridinium.

The —$NR^1$— group shown in Formula (1) is preferably at the 6- position on the naphthalene ring relative to the hydroxy group. When the —$N^1$— group shown in Formula (1) is at the 6-position on the naphthalene ring relative to hydroxy group it is preferred that m has a value of 0.

The compound is preferably in salt form, for example in the form of a sodium, lithium, potassium, ammonium or substituted ammonium salt or a mixture thereof.

It is preferred that compounds of Formula (1) are free from groups which, on treatment with aqueous alkali, yield —$SO_2CH$=$CH_2$ groups.

Compounds of Formula (1) wherein Q is optionally substituted pyridinium may be prepared by condensing the corresponding compound wherein Q is halo (preferably Cl or F) with an optionally substituted pyridine compound, preferably in aqueous medium. Elevated temperatures are preferred for the condensation, for example 60° C. to 110° C., and a time of 1 to 24 hours normally suffices. A pH of 5 to 8 may be used.

The compound of Formula (1) wherein Q is halo may be prepared by condensing one equivalent of an amine of formula $HNR^2R^3$ with a compound of Formula (1) wherein both of the triazine substituents shown on the right hand side are halo. The compound of Formula (1) wherein both of the triazine substituents shown on the right hand side are halo may be prepared by condensing cyanuric halide with a compound of Formula (2) (wherein A, E, $R^1$ and m are as hereinbefore defined), preferably in an aqueous medium, preferably at a pH in the range 5 to 7:

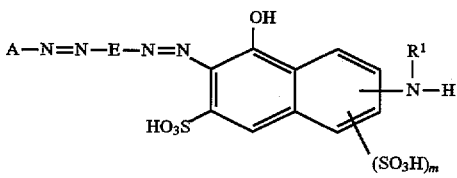

(2)

The compounds of Formula (2) may be prepared by azo chemistry analogous to that known in the dyestuff art, for example by diazotising an amine A—N=N—E—NH$_2$ at below 5° C. using a diazotising agent (e.g. NaNO$_2$/mineral acid) and coupling onto the desired hydroxy naphthalene compound, which may have the —NHR$^1$ group protected if so desired.

The compound of Formula (1) wherein both of the triazine substituents shown on the right hand are halo may also be prepared by diazotising an amine of Formula (3) and coupling onto a compound of Formula (4):

4-carboxypyridinium) are notable for their good dyeing properties, particularly in exhaust dyeing applications. The compounds dye cellulosic materials strong bright shades, demonstrating good build-up and good wash-off properties. The compounds also benefit from compatibility with existing PROCION™ H-EXL™ reactive dyes of different shades, thereby enabling binary and ternary mixtures to be prepared which dye in a highly reproducible manner under a variety of different conditions (PROCION™ dyes are available from ZENECA Specialties, Manchester, England).

The invention is further illustrated but not limited by the following examples in which all parts and percentages are by weight unless otherwise indicated.

EXAMPLE 1

Preparation of

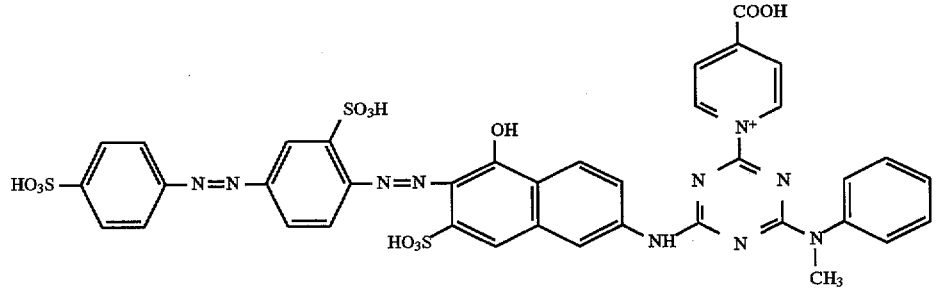

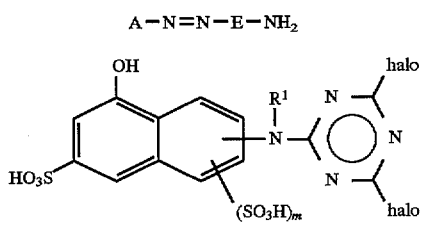

wherein A, E, R$^1$ and m are as hereinbefore defined. The diazotisation is preferably performed below 5° C., preferably in aqueous medium, preferably in the presence of NaNO$_2$ and mineral acid.

According to a further feature of the invention there is provided a process for the coloration of a substrate comprising applying thereto a compound according to the invention.

The preferred substrate contains hydroxyl and/or amino groups, and is preferably a textile material, a leather or a paper. Preferred textile materials are wool, silk, synthetic polyamides and especially cellulosic materials, particularly cotton, jute, hemp and flax.

Preferred coloration processes include exhaust, pad batch, continuous and semi-continuous dyeing and printing, especially exhaust dyeing.

The coloration process for cellulosic textile substrates is preferably performed using a solution of the dye in water. An acid binding agent is normally used in the process for colouring cellulosic substrates. This agent may be applied to the cellulosic textile before, during or after application of the compound. Suitable acid binding agents include NaOH, NaHCO$_3$ and Na$_2$CO$_3$.

A further feature of the invention provides a substrate coloured by the coloration process or using a dye according to the invention.

The compounds of the invention wherein Q is optionally substituted pyridinium (particularly 3- or Stage a 4-Aminoazobenzene-3,4$^1$-disulphonic and (52.3 g, 0.137M) was dissolved in dilute NaOH solution to give a solution of pH 7.5. 2N Sodium nitrite solution (71 ml, 0.142M) was added and the resulting solution was added dropwise, with stirring, to a mixture of ice/water (500 ml) containing concentrated hydrochloric acid (50 ml). The mixture was stirred for 45 minutes at <5° C., excess nitrous acid was destroyed (by adding sulphamic acid) and a solution of 3-hydroxy-6-acetylaminonaphthalene-3-sulphonic acid (MI 343, 47 g, 0.137M) was added. The pH was raised slowly to 2.5 using potassium acetate and the mixture stirred at <5° C. for 30 minutes, then at pH 3 and temperature <5° C. and finally stirred at pH 4.5. Salt solution (25% w/v) was added and the precipitated solid collected. The damp solid was added to hot water (2.5l) to give a gel, the pH was raised to 7.0 using NaOH solution (70°,Tw) then sodium hydroxide (100 g) was added slowly, the mixture was stirred at 75° to 85° C. for 3 hours, salt solution (330 g, 15% w/v) was added to the hot solution and heating discontinued. On cooling the precipitated solid was collected to give 105 g (56% at MI 1377) of 1-Hydroxy-2-[4-(4"-sulphophenylazo)-2'-sulphophenylazo]-6-aminonaphthalene-3-sulphonic acid.

Stage b

A solution of cyanuric chloride (7.4 g, 0.04 M) in acetone (70 ml) was added to a stirred mixture of the product from Stage a) (50 g, MI 1377, 0.036M) in ice/water (500 ml) containing a few drops of calsolene oil. The mixture was stirred at below 5° C., pH 6.5, for 2 hours. Further cyanuric chloride (3.5 g) was added and stirring continued at pH 6.5, 0–5° C., for a further 1 hour, after which HPLC indicated that reaction was essentially complete. The mixture was filtered to remove a small amount of undesirable insoluble material.

Stage c

N-methylaniline (2.14 g, 0.02M) was added to half of the product resulting from Stage b) and the mixture stirred at 50°

C. and pH 6.5. After 2 hours more N-methylaniline (1.0 g) was added and the heating at 50° C. and pH 6.5 was continued for a further 1 hour. The dichlorotriazinyl product precipitated and was collected.

Stage d

4-Carboxy pyridine (12.3 g, 0.1M) was added to a mixture of the product from Stage c) and water (500 ml) and the pH adjusted to 6.5 using sodium carbonate solution (2N). The mixture was heated under reflux for 15 hours and allowed to cool to room temperature. The precipitated sodium isonicotinate was filtered-off and ethanol (740 ml) added to the stirred filtrate. The precipitated product was collected and dried to give the title product (12.0 g, MI 1181, 51% yield) having a λmax (water) at 535.4 nm.

The title product was applied to cotton by exhaust dyeing at 80° C. and the cotton was dyed a bright red shade, showing good fixation.

The method of Example 1 was repeated except that in Stage a), in place of 1-hydroxy-6-acetylaminonapthalene-3-sulphonic acid there was used 1-hydroxy-6-N-acetylmethylaminonaphthalene-3-sulphonic acid. The title product was found to have a λmax of 530.5 nm (water).

The title product was applied to cotton by exhaust dyeing to give a bright red shade, showing good build-up, high fixation and good wash-off.

EXAMPLE 2

Preparation of

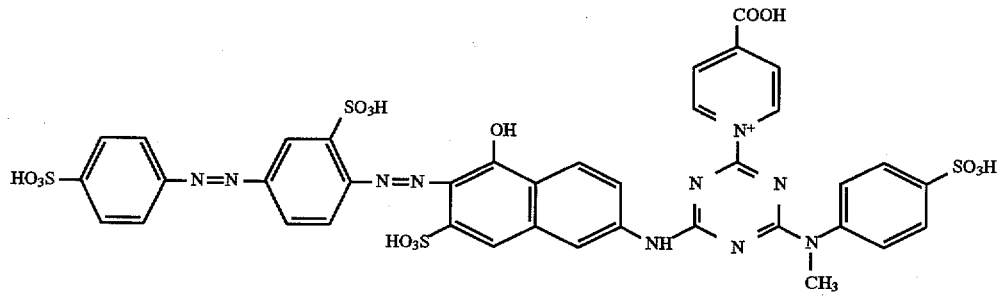

The method of Example 1 was followed except that in Stage c) 4-sulpho-N-methylaniline was used in place of N-methylaniline. The title product had a λmax at 534 nm (water).

The title product was applied to cotton by exhaust dyeing to give a bright yellowish-red shade, showing excellent build-up and fixation.

EXAMPLE 3

Preparation of

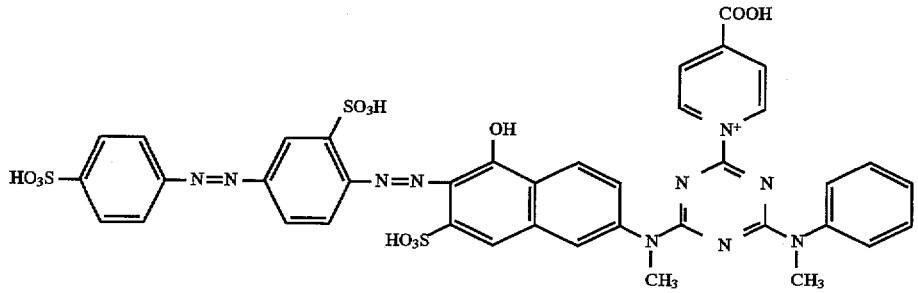

EXAMPLE 4

Preparation of

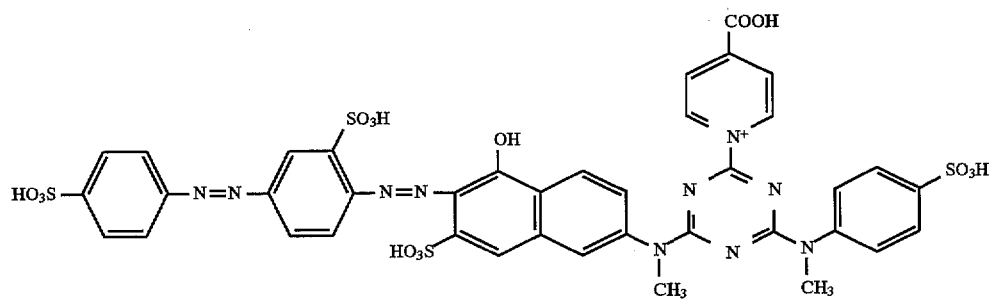

The method of Example 3 was followed except that 4-sulpho-N-methylaniline was used in place of N-methylaniline. The title product had a λmax at 518 nm (water).

The title product was applied to cotton by exhaust dyeing to give a bright yellowish-red shade showing good build-up and wash-off.

EXAMPLES 5 to 34

Dyes of Formula (5) described in Table 1 below were prepared using an analogous process to that described in Example 1:

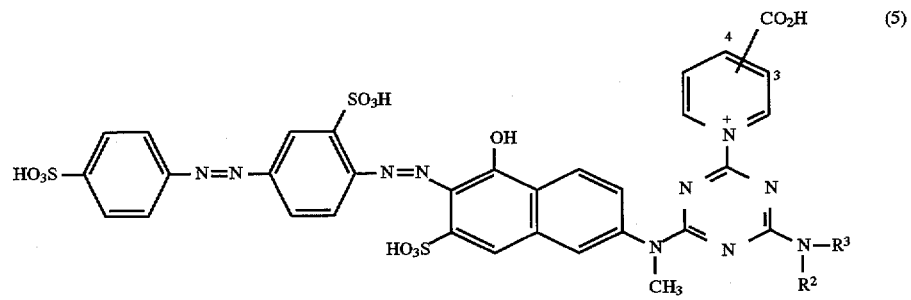

(5)

TABLE 1

| Example | R² | R³ | Position of —CO₂H | λmax (nm) |
|---|---|---|---|---|
| 5 | —CH₃ | 4-sulphophenyl | 4 | 516 |
| 6 | —CH₂CO₂H | —CH₃ | 4 | 514 |
| 7 | —CH₃ | —CH₃ | 4 | 517 |
| 8 | —H | 2,5-disulphophenyl | 4 | 517 |
| 9 | —H | —CH₂CH₂OH | 4 | 515 |
| 10 | —CH₂CH₂OH | —CH₂CH₂OH | 4 | 517 |
| 11 | —CH₃ | —(CH₂)₃CO₂H | 4 | 513 |
| 12 | —CH₃ | —CH₂CH₂OH | 4 | 530 |
| 13 | —H | —CH₂CH₂SO₃H | 4 | 511 |
| 14 | —H | —CH₂CH₂OSO₃H | 4 | 511 |
| 15 | —CH₃ | —H | 4 | 517 |
| 16 | —H | —H | 4 | 515 |
| 17 | —CH₂CH₃ | —CH₂CO₂H | 4 | 512 |
| 18 | —CH₂CH₃ | —CH₂CO₂H | 3 | 511 |
| 19 | —CH₂PO₃H₂ | —CH₂CO₂H | 4 | 514 |
| 20 | —CH₂CO₂H | —CH₂PO₃H₂ | 3 | 513 |

TABLE 1-continued

| Example | R² | R³ | Position of —CO₂H | λmax (nm) |
|---|---|---|---|---|
| 21 | —H | —CH(CO₂H)CH₂CO₂H | 4 | 512 |
| 22 | —H | —CH(CO₂H)CH₂CO₂H | 3 | 512 |
| 23 | —CH(CO₂H)CH₂CH₂CO₂H | —H | 4 | 512 |
| 24 | —CH(CO₂H)CH₂CH₂CO₂H | —H | 3 | 511 |
| 25 | —H | —H | 3 | 514 |
| 26 | —NR²R³=piperidinyl | | 4 | 532 |
| 27 | —NR²R³=piperidinyl | | 3 | 530 |
| 28 | —NR²R³=morpholinyl | | 4 | 531 |
| 29 | —NR²R³=morpholinyl | | 3 | 529 |
| 30 | —CH₂CH₃ | —CH₂CH₃ | 4 | — |
| 31 | —CH₂CH₃ | —CH₂CH₃ | 3 | — |
| 32 | —CH₃ | —OCH₃ | 3 | 517 |
| 33 | —H | 3-sulphophenyl | 3 | 516 |
| 34 | —CH₂CH₂CH₃ | —CH₂CH₂CH₃ | 3 | — |

EXAMPLES 35 to 44

The method of Example 1 may be repeated except that in place of 4-carboxy pyridine there is used the pyridine compounds mentioned below:

| Example | Pyridine Compound |
|---|---|
| 35 | pyridine |
| 36 | 3-methylpyridine |
| 37 | 3-carbonamidopyridine |
| 38 | 4-carbonamidopyridine |
| 39 | 3-methoxycarbonyl pyridine |
| 40 | 4-methoxycarbonyl pyridine |
| 41 | 3-ethoxycarbonyl pyridine |
| 42 | 4-ethxoycarbonyl pyridine |
| 43 | 4-methyl pyridine |
| 44 | 2-methyl pyridine |

EXAMPLES 45 to 58

The method of Example 3 may be repeated except that in place of 4-aminoazobenzene-3,4'-disulphonic acid there is used the amine referred to below:

| Example | Amine |
|---|---|
| 45 | 4-aminoazobenzene-3,3'-disulphonic acid |
| 46 | 4-amino-4¹-sulphoazobenzene |
| 47 | 4-amino-2¹,4¹-disulphoazobenzene |
| 48 | 4-aminoazobenzene-2,5¹-disulphonic acid |
| 49 | 4-aminoazobenzene-3¹-sulphonic acid |
| 50 | 4-amino-2-methylazobenzene-4¹-sulphonic acid |
| 51 | 4-amino-3-methylazobenzene-4¹-sulphonic acid |
| 52 | 4-amino-2-methylazobenzene-5,4¹-disulphonic acid |
| 53 | 4-amino-4¹-methylazobenzene-3,2¹-disulphonic acid |
| 54 | 4-amino-2¹-methylazobenzene-3,4¹-disulphonic acid |
| 55 | 4-amino-2-methoxyazobenzene-2¹-carboxy-5¹ sulphonic acid |
| 56 | 4-amino-2-methoxyazobenzene-2¹-carboxy-4¹- sulphonic acid |
| 57 | 4-amino-6-acetylaminoazobenzene-2¹,4¹, 3-trisulphonic acid |
| 58 | 4-amino-6-acetylaminoazobenzene-2¹,4¹, 3-trisulponic acid |

EXAMPLES 59 to 65

The method of Example 2 may be repeated except that in place of 1-hydroxy-6-acetylaminonaphthalene-3-sulphonic acid there is used the naphthalene compound indicated below:

| Example | Naphthalene Compound |
|---|---|
| 59 | 1-hydroxy-8-acetylaminonaphthalene-3,6-disulphonic acid |
| 60 | 1-hydroxy-8-acetylaminonaphthalene-3,5-disulphonic acid |
| 61 | 1-hydroxy-7-acetylaminonaphthalene-3-sulphonic acid |
| 62 | 1-hydroxy-7-acetylaminonaphthalene-3,6-disulphonic acid |
| 63 | 1-hydroxy-7-(N-acetyl)methylaminonaphthalene-3-sulphonic acid |
| 64 | 1-hydroxy-7-(N-acetyl)methylaminonaphthalene-3,6-disulphonic acid |
| 65 | 1-hydroxy-6-acetylaminonaphthalene-3,5-disulphonic acid |

I claim:

1. A compound of Formula (1) or a salt thereof:

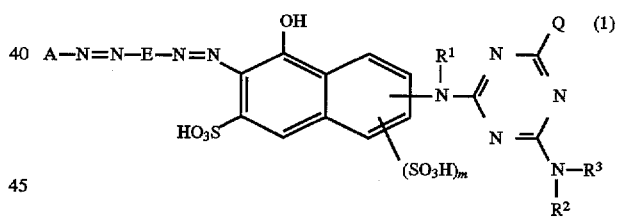

wherein:

A is phenyl substituted by 1 or 2 sulpho groups and optionally by $C_{1-4}$-alkyl or carboxy;

E is optionally substituted phenylene;

$R^1$ is H or optionally substituted alkyl;

$R^2$ is H or optionally substituted alkyl and $R^3$ is H, optionally substituted alkyl, optionally substituted alkoxy or optionally substituted aryl, or $R^2$ and $R^3$ taken together with the N atom to which they are attached form an optionally substituted piperidine or morpholine ring;

Q is optionally substituted pyridinium; and m is 0 or 1.

2. A compound according to claim 1 wherein Q is pyridinium having 1 or 2 substituents selected from carboxy, $C_{1-4}$-alkyl and carbonamido.

3. A compound according to claim 1 wherein Q is 3- or 4-carboxypyridinium.

4. A compound according to any one of the preceding claims wherein the —NR¹— group shown in Formula (1) is at the 6-position on the naphthalene ring relative to the hydroxy group.

5. A compound according to any one of the preceding claims wherein $R^3$ is H, optionally substituted alkyl or optionally substituted aryl, wherein the optional substituents are selected from halo, nitro, $C_{1-4}$-alkyl, $C_{1-4}$-alkoxy, sulpho, carboxy, carbonamido, acylamino, ureido, hydroxy, phosphato, sulphato and amino.

6. A compound according to any one of the preceding claims wherein $R^2$ and $R^3$ are each independently H, $C_{1-4}$-alkyl or $C_{1-4}$-alkyl having a hydroxy group, or $R^2$ or $R^3$ taken together with the N atom to which they are attached form an optionally substituted piperidine or morpholine ring.

7. A compound according to claim 1 wherein E is 1,4-phenylene which is unsubstituted or substituted by 1 or 2 groups selected from halo, sulpho and $C_{1-4}$-alkyl; $R^1$ is H or $C_{1-4}$-alkyl; $R^2$ is H or optionally substituted $C_{1-4}$-alkyl and $R^3$ is H, optionally substituted phenyl or optionally substituted alkyl, or $R^2$ and $R^3$ taken together with the N atom to which they are attached form a piperidine or morpholine ring; Q is 3- or 4-carboxypyridinium; the —$NR^1$— group shown in Formula (1) is at the 6-position on the naphthalene ring relative to the hydroxy group; and m is 0.

8. A process for preparing a compound according to claim 1 wherein a compound of Formula (1), as defined in claim 1 except that Q is halo, is condensed with an optionally substituted pyridine compound.

9. A process for the coloration of a substrate comprising applying thereto a compound according to any one of claims 1 to 7.

* * * * *